United States Patent
Zhang et al.

(10) Patent No.: US 12,354,594 B2
(45) Date of Patent: Jul. 8, 2025

(54) TECHNIQUES FOR DISENTANGLED VARIATIONAL SPEECH REPRESENTATION LEARNING FOR ZERO-SHOT VOICE CONVERSION

(71) Applicant: TENCENT AMERICA LLC, Palo Alto, CA (US)

(72) Inventors: Chunlei Zhang, Palo Alto, CA (US); Jiachen Lian, Palo Alto, CA (US); Dong Yu, Palo Alto, CA (US)

(73) Assignee: TENCENT AMERICA LLC, Palo Alto, CA (US)

( * ) Notice: Subject to any disclaimer, the term of this patent is extended or adjusted under 35 U.S.C. 154(b) by 389 days.

(21) Appl. No.: 17/723,662

(22) Filed: Apr. 19, 2022

(65) Prior Publication Data
US 2023/0335109 A1    Oct. 19, 2023

(51) Int. Cl.
| | | |
|---|---|---|
| *G10L 13/047* | (2013.01) | |
| *G06N 3/04* | (2023.01) | |
| *G06N 3/08* | (2023.01) | |
| *G10L 13/07* | (2013.01) | |
| *G10L 21/003* | (2013.01) | |
| *G10L 17/02* | (2013.01) | |
| *G10L 17/18* | (2013.01) | |

(52) U.S. Cl.
CPC .............. *G10L 13/047* (2013.01); *G06N 3/04* (2013.01); *G06N 3/08* (2013.01); *G10L 13/07* (2013.01); *G10L 21/003* (2013.01); *G10L 17/02* (2013.01); *G10L 17/18* (2013.01)

(58) Field of Classification Search
None
See application file for complete search history.

(56) References Cited

U.S. PATENT DOCUMENTS

| | | |
|---|---|---|
| 2020/0365166 A1* | 11/2020 | Zhang ............... G10L 19/00 |
| 2020/0380952 A1 | 12/2020 | Zhang et al. |
| 2021/0142120 A1* | 5/2021 | Min ................. G06F 18/214 |
| 2021/0272571 A1* | 9/2021 | Balasubramaniam .. G10L 15/02 |
| 2021/0280202 A1 | 9/2021 | Wang et al. |

OTHER PUBLICATIONS

International Search Report dated Jan. 11, 2023 in International Application No. PCT/US22/43323.
Written Opinion dated Jan. 11, 2023 in International Application No. PCT/US22/43323.
Bai et al., "Contrastively Disentangled Sequential Variational Autoencoder", 35th Conference on Neural Information Processing Systems NeurIPS, Oct. 2021, pp. 1-25 (25 pages total).

* cited by examiner

*Primary Examiner* — Antim G Shah
(74) *Attorney, Agent, or Firm* — Sughrue Mion, PLLC (57) ABSTRACT

A method for disentangled variational speech representation learning for voice conversion, performed by at least one processor, is provided. The method includes receiving input speech segments, encoding the input speech segments via a shared encoder to generate a speaker embedding and a content embedding, encoding the posterior distributions of the speaker embedding via a speaker encoder and encoding the posterior distributions of the content embedding via a content encoder to obtain encoded results, and decoding the encoded results by concatenating the encoded results to obtain a reconstructed speech output.

20 Claims, 5 Drawing Sheets

TECHNIQUES FOR DISENTANGLED VARIATIONAL SPEECH REPRESENTATION LEARNING FOR ZERO-SHOT VOICE CONVERSION

BACKGROUND

Field

Embodiments of the present disclosure may relate to zero-shot voice conversion (VC) from a perspective of self-supervised disentangled speech representation learning to achieve disentanglement by balancing the information flow between global speaker representations and time-varying content representations in a sequential variational auto-encoder (VAE).

Description of Related Art

In related art, studies on VC have made progress with parallel training data and known speakers. Traditionally, good conversion quality is obtained by exploring better alignment modules or expressive mapping functions.

Voice conversion seeks to convert non-linguistic information of a source speaker to a target speaker while keeping the linguistic content unchanged. For this reason, VC gains a lot of attraction in applications such as privacy protection, security, and the entertainment industry, etc. Current VC systems can be categorized into two methodologies. The first methodology employs a conversion model to map source acoustic features to target acoustic features. This method assumes that the speaker of the source-target VC pair is already known. The second methodology constructs VC based on explicitly learned speaking styles and content representations. Among these learned approaches, phonetic posteriorgrams (PPGs) are widely used as the speaker independent content representations, and speaker embedding's extracted from a pre-trained speaker verification model are often assumed to carry timbre information. These methods, however, do not generalize on unseen speakers during inference.

For zero-shot VC, related art describe constructing encoder-decoder frameworks wherein the encoder compresses the speaking style and the content information into the latent embedding, and the decoder generates a voice sample by combining a speaking style embedding and a content embedding. However, these models require a positive pair of utterances (i.e., two utterances coming from the same speaker) during training, and the systems must rely on pre-trained speaker models.

SUMMARY

One or more example embodiments of the present disclosure provide a method and an apparatus for disentangled variational speech representation learning for zero-shot voice conversion.

According to embodiments, there is provided a method performed by at least one processor. The method includes receiving input speech segments, encoding the input speech segments via a shared encoder to generate a speaker embedding and a content embedding, encoding the posterior distributions of the speaker embedding via a speaker encoder and encoding the posterior distributions of the content embedding via a content encoder to obtain encoded results, and decoding the encoded results by concatenating the encoded results to obtain a reconstructed speech output.

According to embodiments, there is provided an apparatus. The apparatus may include at least one memory storing instructions and at least one processor configured to read the program code and operate as instructed by the program code. The program code may include retrieving code configured to cause the at least one processor to receiving code configured to cause the at least one processor to receive input speech segments, first encoding code configured to cause the at least one processor to encode the input speech segments via a shared encoder to generate a speaker embedding and a content embedding, second encoding code configured to cause the at least one processor to encode the posterior distributions of the speaker embedding via a speaker encoder and encode the posterior distributions of the content embedding via a content encoder to obtain encoded results, and decoding code configured to cause the at least one processor to decode the encoded results by concatenating the encoded results to obtain a reconstructed speech output.

According to one or more embodiments, there is provided a non-transitory computer-readable medium storing computer code. The computer code may be configured to, when executed by at least one processor, cause the at least one processor to receive input speech segments, encode the input speech segments via a shared encoder to generate a speaker embedding and a content embedding, encode the posterior distributions of the speaker embedding via a speaker encoder and encoding the posterior distributions of the content embedding via a content encoder to obtain encoded results, decode the encoded results by concatenating the encoded results to obtain a reconstructed speech output.

Additional aspects will be set forth in part in the description that follows and, in part, will be apparent from the description, or may be realized by practice of the presented embodiments of the disclosure.

BRIEF DESCRIPTION OF THE DRAWINGS

The above and other aspects, features, and aspects of embodiments of the disclosure will be more apparent from the following description taken in conjunction with the following accompanying drawings.

DETAILED DESCRIPTION

The present disclosure relates to a method and a system for disentangled variational speech representation learning for zero-shot VC. A zero-shot VC may be performed by feeding an arbitrary speaker embedding and content embeddings to a VAE decoder. Further, an on-the-fly data augmentation training strategy may be applied to make the learned representation noise invariant. Embodiments deliver a robust self-supervised zero-shot voice identity conversion framework that (1) gets rid of the reliance on any supervisory labels and pre-trained models, (2) generalizes to unseen speakers during inference, and (3) generates noise invariant speaker and content representations.

Embodiments of the present disclosure are described comprehensively with reference to the accompanying drawings. However, the examples of implementations may be implemented in various multiple forms, and the disclosure should not be construed as being limited to the examples described herein. Conversely, the examples of implementations are provided to make the technical solution of the disclosure more comprehensive and complete, and comprehensively convey the idea of the examples of the implementations to a person skilled in the art. The accompanying drawings are merely example illustrations of the disclosure and are not necessarily drawn to scale.

The proposed features discussed below may be used separately or combined in any order. Some block diagrams shown in the accompany drawings are functional entities and do not necessarily correspond to physically or logically independent entities. Further, the embodiments may be implemented by processing circuitry (e.g., one or more processors or one or more integrated circuits) or as computer software using computer-readable instructions and physically stored in one or more computer-readable media, or implemented in different networks and/or processor apparatuses and/or microcontroller apparatuses. In one example, the one or more processors execute computer program code that is stored in a one or more non-transitory computer-readable media.

Figure 1:
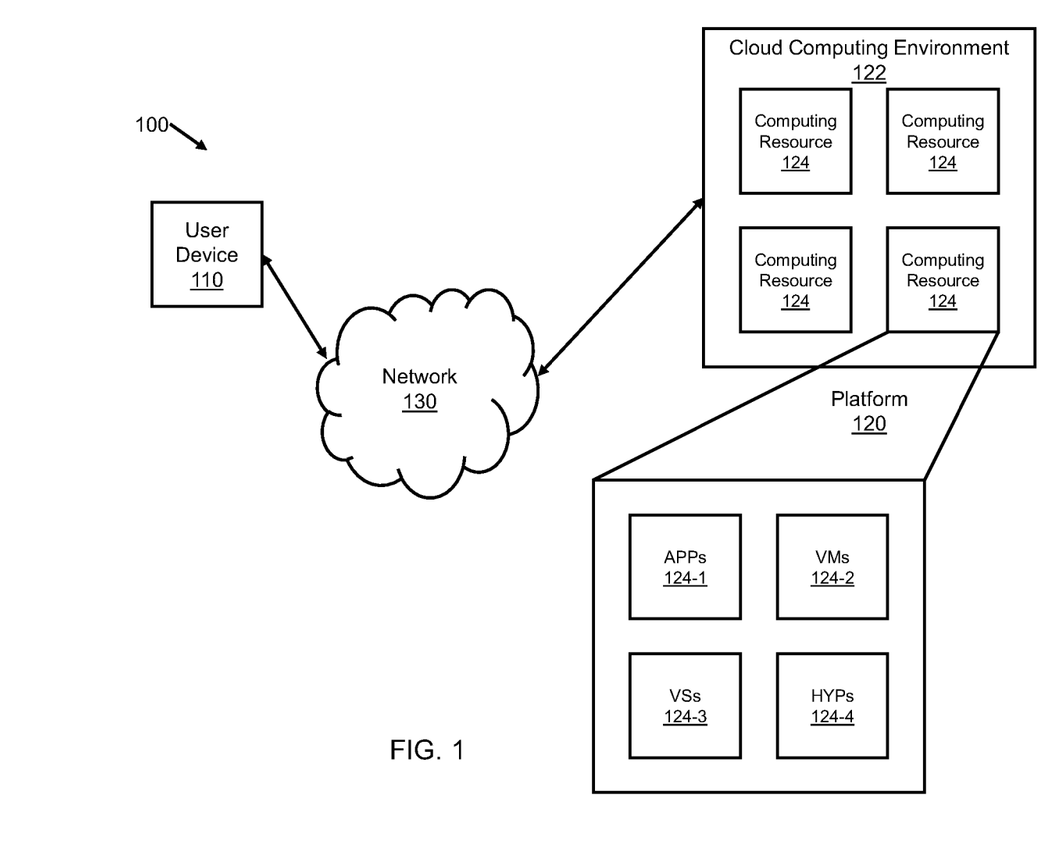
FIG. 1 is a diagram of an environment in which methods, apparatuses and systems described herein may be implemented, according to embodiments.

FIG. 1 is a diagram of an environment 100 in which methods, apparatuses and systems described herein may be implemented, according to embodiments.

As shown in FIG. 1, the environment 100 may include a user device 110, a platform 120, and a network 130. Devices of the environment 100 may interconnect via wired connections, wireless connections, or a combination of wired and wireless connections.

The user device 110 includes one or more devices capable of receiving, generating, storing, processing, and/or providing information associated with platform 120. For example, the user device 110 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, the user device 110 may receive information from and/or transmit information to the platform 120.

The platform 120 includes one or more devices as described elsewhere herein. In some implementations, the platform 120 may include a cloud server or a group of cloud servers. In some implementations, the platform 120 may be designed to be modular such that software components may be swapped in or out. As such, the platform 120 may be easily and/or quickly reconfigured for different uses.

In some implementations, as shown, the platform 120 may be hosted in a cloud computing environment 122. Notably, while implementations described herein describe the platform 120 as being hosted in the cloud computing environment 122, in some implementations, the platform 120 may not be cloud-based (i.e., may be implemented outside of a cloud computing environment) or may be partially cloud-based.

The cloud computing environment 122 includes an environment that hosts the platform 120. The cloud computing environment 122 may provide computation, software, data access, storage, etc. services that do not require end-user (e.g., the user device 110) knowledge of a physical location and configuration of system(s) and/or device(s) that hosts the platform 120. As shown, the cloud computing environment 122 may include a group of computing resources 124 (referred to collectively as "computing resources 124" and individually as "computing resource 124").

The computing resource 124 includes one or more personal computers, workstation computers, server devices, or other types of computation and/or communication devices. In some implementations, the computing resource 124 may host the platform 120. The cloud resources may include compute instances executing in the computing resource 124, storage devices provided in the computing resource 124, data transfer devices provided by the computing resource 124, etc. In some implementations, the computing resource 124 may communicate with other computing resources 124 via wired connections, wireless connections, or a combination of wired and wireless connections.

As further shown in FIG. 1, the computing resource 124 includes a group of cloud resources, such as one or more applications ("APPs") 124-1, one or more virtual machines ("VMs") 124-2, virtualized storage ("VSs") 124-3, one or more hypervisors ("HYPs") 124-4, or the like.

The application 124-1 includes one or more software applications that may be provided to or accessed by the user device 110 and/or the platform 120. The application 124-1 may eliminate a need to install and execute the software applications on the user device 110. For example, the application 124-1 may include software associated with the platform 120 and/or any other software capable of being provided via the cloud computing environment 122. In some implementations, one application 124-1 may send/receive information to/from one or more other applications 124-1, via the virtual machine 124-2.

The virtual machine 124-2 includes a software implementation of a machine (e.g., a computer) that executes programs like a physical machine. The virtual machine 124-2 may be either a system virtual machine or a process virtual machine, depending upon use and degree of correspondence to any real machine by the virtual machine 124-2. A system virtual machine may provide a complete system platform that supports execution of a complete operating system ("OS"). A process virtual machine may execute a single program, and may support a single process. In some implementations, the virtual machine 124-2 may execute on behalf of a user (e.g., the user device 110), and may manage infrastructure of the cloud computing environment 122, such as data management, synchronization, or long-duration data transfers.

The virtualized storage 124-3 includes one or more storage systems and/or one or more devices that use virtualization techniques within the storage systems or devices of the computing resource 124. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

The hypervisor 124-4 may provide hardware virtualization techniques that allow multiple operating systems (e.g., "guest operating systems") to execute concurrently on a host computer, such as the computing resource 124. The hypervisor 124-4 may present a virtual operating platform to the guest operating systems, and may manage the execution of the guest operating systems. Multiple instances of a variety of operating systems may share virtualized hardware resources.

The network 130 may include one or more wired and/or wireless networks. For example, the network 130 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of the environment 100 may perform one or more functions described as being performed by another set of devices of the environment 100.

Figure 2:
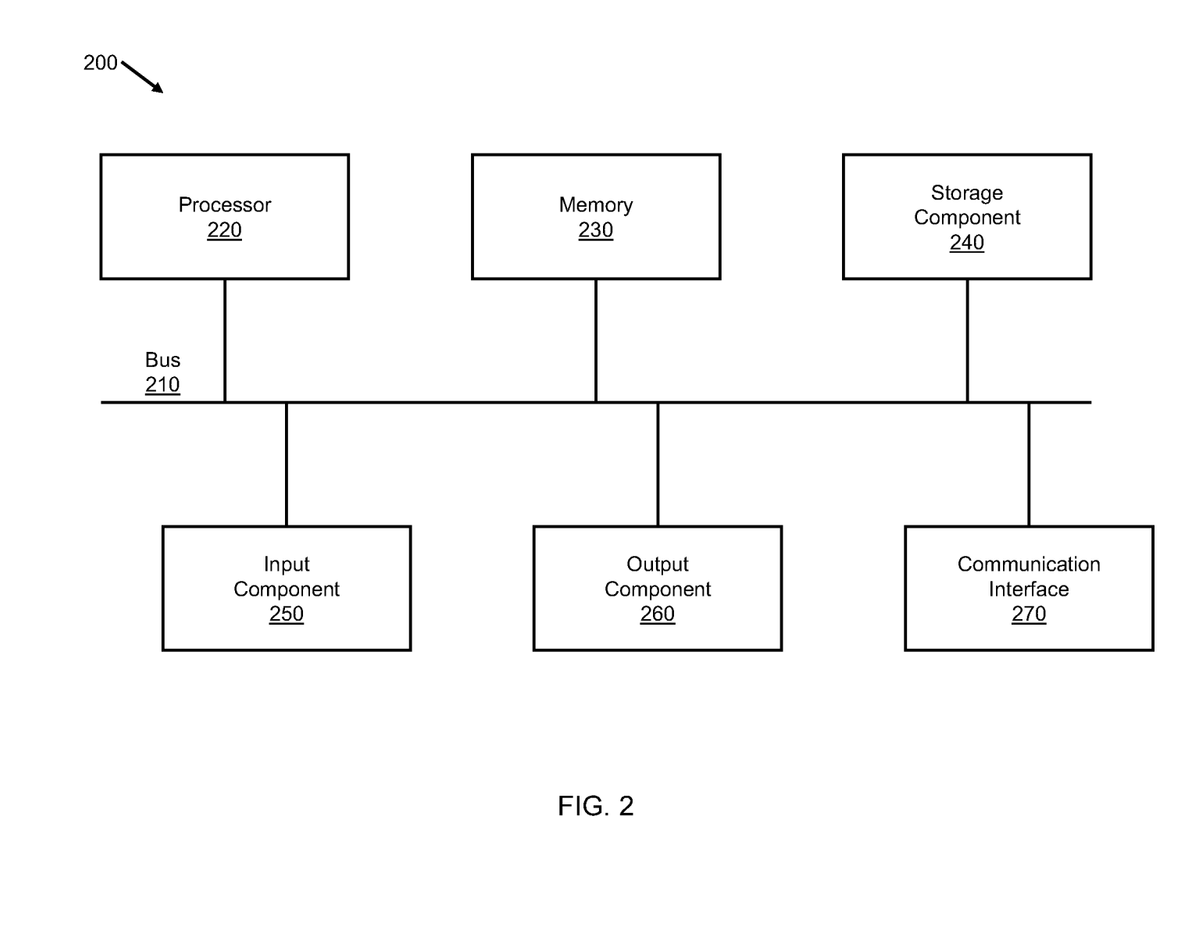
FIG. 2 is a block diagram of example components of one or more devices of FIG. 1.

FIG. 2 is a block diagram of example components of one or more devices of FIG. 1.

A device 200 may correspond to the user device 110 and/or the platform 120. As shown in FIG. 2, the device 200 may include a bus 210, a processor 220, a memory 230, a storage component 240, an input component 250, an output component 260, and a communication interface 270.

The bus 210 includes a component that permits communication among the components of the device 200. The processor 220 is implemented in hardware, firmware, or a combination of hardware and software. The processor 220 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, the processor 220 includes one or more processors capable of being programmed to perform a function. The memory 230 includes a random access memory (RAM), a read only memory (ROM), and/or another type of dynamic or static storage device (e.g., a flash memory, a magnetic memory, and/or an optical memory) that stores information and/or instructions for use by the processor 220.

The storage component 240 stores information and/or software related to the operation and use of the device 200. For example, the storage component 240 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive.

The input component 250 includes a component that permits the device 200 to receive information, such as via user input (e.g., a touch screen display, a keyboard, a keypad, a mouse, a button, a switch, and/or a microphone). Additionally, or alternatively, the input component 250 may include a sensor for sensing information (e.g., a global positioning system (GPS) component, an accelerometer, a gyroscope, and/or an actuator). The output component 260 includes a component that provides output information from the device 200 (e.g., a display, a speaker, and/or one or more light-emitting diodes (LEDs)).

The communication interface 270 includes a transceiver-like component (e.g., a transceiver and/or a separate receiver and transmitter) that enables the device 200 to communicate with other devices, such as via a wired connection, a wireless connection, or a combination of wired and wireless connections. The communication interface 270 may permit the device 200 to receive information from another device and/or provide information to another device. For example, the communication interface 270 may include an Ethernet interface, an optical interface, a coaxial interface, an infrared interface, a radio frequency (RF) interface, a universal serial bus (USB) interface, a Wi-Fi interface, a cellular network interface, or the like.

The device 200 may perform one or more processes described herein. The device 200 may perform these processes in response to the processor 220 executing software instructions stored by a non-transitory computer-readable medium, such as the memory 230 and/or the storage component 240. A computer-readable medium is defined herein as a non-transitory memory device. A memory device includes memory space within a single physical storage device or memory space spread across multiple physical storage devices.

Software instructions may be read into the memory 230 and/or the storage component 240 from another computer-readable medium or from another device via the communication interface 270. When executed, software instructions stored in the memory 230 and/or the storage component 240 may cause the processor 220 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 2 are provided as an example. In practice, the device 200 may include additional components, fewer components, different components, or differently arranged components than those shown in FIG. 2. Additionally, or alternatively, a set of components (e.g., one or more components) of the device 200 may perform one or more functions described as being performed by another set of components of the device 200.

In one or more embodiments, the VAE is extended as the backbone framework for learning disentangled content representation and speaking style representation, where balanced content and style information flow is achieved in training the VAE. According to embodiments, three conditions may be applied to sufficiently guide the VAE training process to enhance the final VC performance and make the learned representation robust against background noise/music, interfering speakers, etc. An on-the-fly data augmentation is introduced as the inductive bias to the VAE training process. The result of this training strategy is a de-noising disentangled sequential VAE (D-DSVAE), where low quality speech input is allowed to test for VC. With these contributions, this modified form of DSVAE (i.e., D-DS- VAE) according to embodiments may enhance VC performance and improve robustness of the VC system.

Figure 3A:
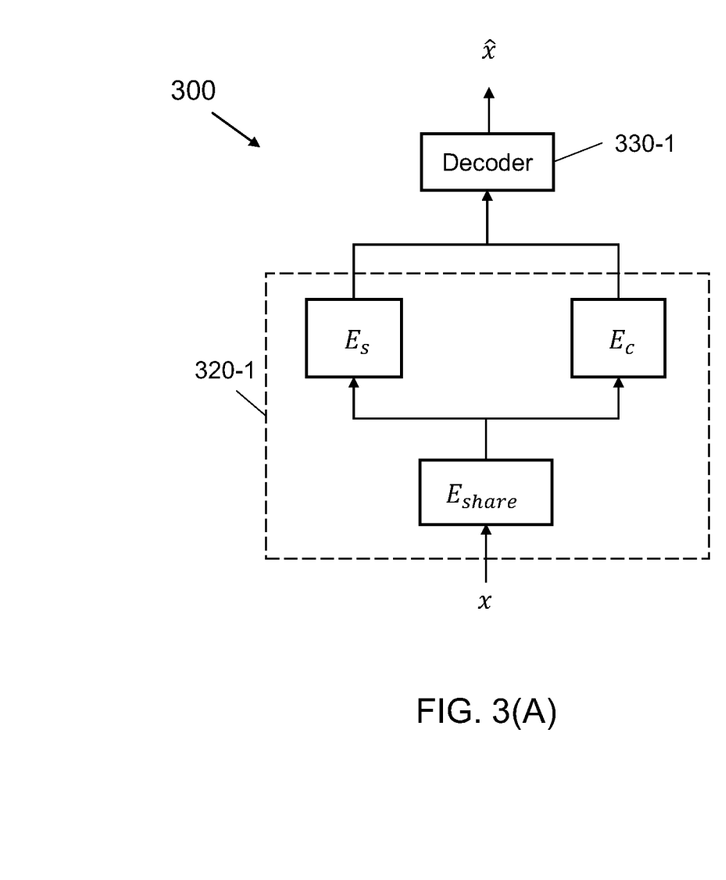
FIGS. 3(A)-3(B) are illustrations of a system for a D-DS-VAE, according to an embodiment.
Figure 3B:
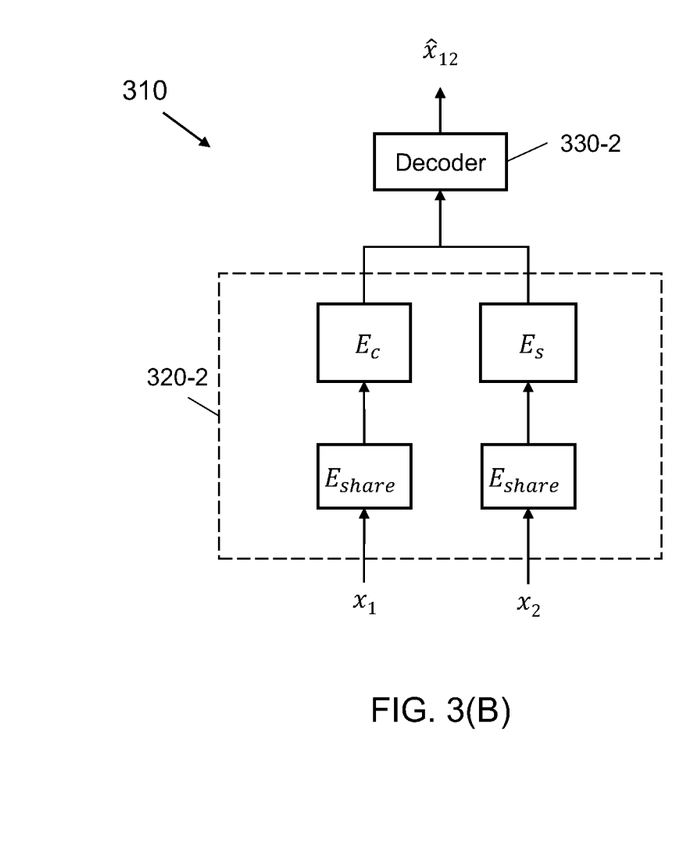

FIGS. 3(A)-3(B) illustrate a system for a D-DSVAE (hereinafter "D-DSVAE system") according to an embodiment. FIG. 3(A) is an illustration of the D-DSVAE system 300 during a training process and FIG. 3(B) is an illustration of the D-DSVAE system 310 during an inference process. Encoders and decoders, illustrated in FIGS. 3(A)-3(B), with the similar reference names/numbers may be the same or different.

As shown in FIG. 3(A), the D-DSVAE system 300 may include an encoder 320-1. The encoder 320-1 further including a shared encoder $E_{share}$, a speaker encoder $E_S$, and a content encoder $E_C$. An input speech segment x passes into the shared encoder $E_{share}$. Then, the results of the shared encoder pass through the speaker encoder $E_S$ and content encoder $E_C$. The speaker encoder $E_S$ and content encoder $E_C$ encode the posterior distributions of a speaker embedding and a content embedding, respectively. During the training process, the encoded speaker embedding $Z_S$ and the encoded content embedding $Z_C$ are concatenated in a decoder 330-1 to reconstruct the speech and generated a reconstructed speech segment $\hat{x}$.

As shown in FIG. 3(B), the D-DSVAE system 310 may include an encoder 320-2. The encoder 320-2 further including a shared encoder $E_{share}$, a speaker encoder $E_S$, and a content encoder $E_C$. Input speech segment $x_1$ and $x_2$ pass into shared encoders $E_{share}$. Then, the results of each of the shared encoders pass through the speaker encoder $E_S$ and content encoder $E_C$, respectively. The speaker encoder $E_S$ and content encoder $E_C$ encode the posterior distributions of a speaker embedding and a content embedding, respectively. During the inference process (i.e., the speech conversion process), the encoded speaker embedding $Z_{S2}$ and the encoded content embedding $Z_{C1}$ are concatenated in a decoder 330-2 to achieve VC and generate a VC speech segment $\hat{x}_{12}$. The overall loss objective of the D-DSVAE system 300/310 is the VAE loss of the two posterior distributions from the speaker encoder $E_S$ and the content encoder $E_C$. It is understood that embodiments are not limited to this configuration. For example, the D-DSVAE system 310 may include one shared encoder $E_{share}$ with speech segment $x_1$ and $x_2$ as inputs.

Embodiments adopt Texas Instruments/Massachusetts Institute of Technology (TIMIT) and Voice Cloning Toolkit (VCTK) datasets. Two models are designed for TIMIT and VCTK, respectively. Similar to the D-DSVAE system 300/310 shown in FIGS. 3(A)-3(B), the two models include an encoder (e.g., 320-1/320-2) composed of a shared encoder $E_{share}$, a speaker encoder $E_S$, and a content encoder $E_C$. Embodiments also describe three sufficient conditions wherein disentanglement may be achieved in these two models.

For TIMIT, the shared encoder $E_{share}$ is a 2-layer MLP with a hidden size of 256. The content encoder $E_C$ is a 2-layer BiLSTM with a hidden size of 512, followed by a RNN layer with a hidden size of 512, further followed by a 2-layer MLP of hidden size (512,64). The speaker encoder $E_S$ follows a similar configuration as described with reference to the content encoder $E_C$, except the speaker encoder $E_S$ has an average pooling layer after the RNN layer, followed by the 2-layer MLP. The TIMIT decoder (e.g., 330-1/330-2) is a 1-layer MLP, followed by a 2-layer BiLSTM, which is further followed by a 2-layer MLP with a hidden size of 256. An algorithm (e.g., the Griffin-lim algorithm) may be applied to the TIMIT as a vocoder.

For VCTK, the shared encoder $E_{share}$ is composed of three convolutional layers with 512 channels. Each convolutional layer is followed by a linear layer with a dimension of 512 and an Instancenorm2D layer. The VCTK decoder (e.g., 330-1/330-2) includes a pre-net with 512 channels and a post-net, which is a BiLSTM with a hidden size of 512, followed by three convolutional layers with 512 channels, followed by a BiLSTM with a hidden size of 512 and two separate linear layers to project the hidden dimension to 80. A pre-trained wavenet may be used on the VCTK as a vocoder.

In embodiments, the loss objective is defined by a loss function of the VC system. The loss function may be based on three items: the reconstruction loss between an input mel spectrogram and a reconstruction of the input mel spectrogram, a KL-Divergence between the prior and posterior distribution of the speaker embedding, and a KL-Divergence between the prior and posterior distribution of the content embedding. The loss function also includes a weighted factor for each item.

The loss objective of an original VAE may be re-written as the summation of variational mutual information and the reconstruction loss. Therefore, if the variational mutual information is bounded, the VAE may reconstruct speech from a latent representation of the encoded speaker and content embedding's. Additionally, information flow may exist between the speaker embedding (i.e., $Z_S$ and $Z_{S2}$) and the content embedding (i.e., $Z_C$ and $Z_{C1}$), and a balance of the information flow may be controlled by appropriately selecting weighted factors. Finally, the speaker embedding may be obtained by averaging out all the frames such that the other embedding will mainly carry content information.

To make the learned speaker embedding $Z_{S2}$ and content embedding $Z_{C1}$ in the inference process robust against background noise, a change is made in the training process. The augmented speech segment is passed into the encoder while the decoder is still used to reconstruct the clean speech. That is, the reconstructed speech segment $\hat{x}$ is input to the encoder 320-1 while the decoder 330-1 continues to reconstruct the input speech segment x. In some embodiments, clean utterance is augmented by MUSAN dataset with a balanced "noise", "music", and "babble" distribution.

Figure 4:
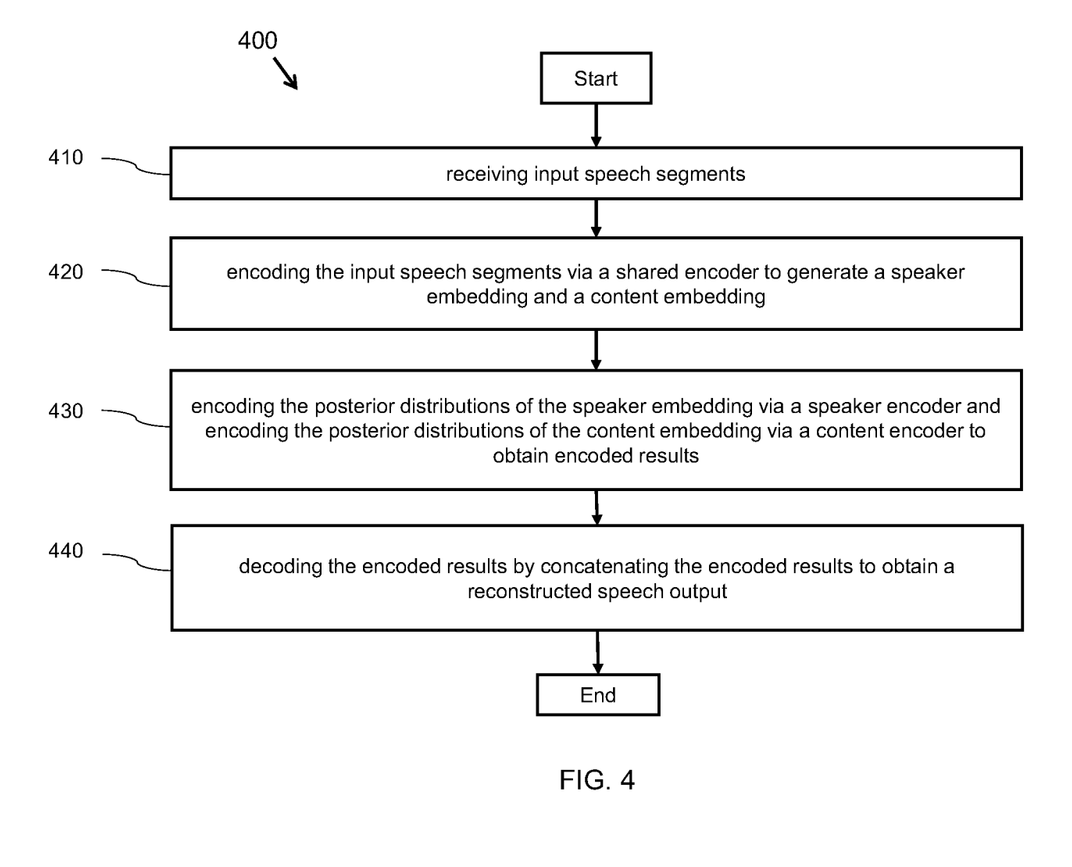
FIG. 4 is an exemplary flowchart illustrating a method for disentangled variational speech representation learning for zero-shot voice conversion, according to one or more embodiments.

FIG. 4 is an exemplary flowchart illustrating a method 400 for disentangled variational speech representation learning for voice conversion, according to an embodiment.

In operation 410, the method 400 may include receiving input speech segments.

In operation 420, the method 400 may include encoding the input speech segments via a shared encoder to generate a speaker embedding and a content embedding.

In operation 430, the method 400 may include encoding the posterior distributions of the speaker embedding via a speaker encoder and encoding the posterior distributions of the content embedding via a content encoder to obtain encoded results.

In operation 440, the method 400 may include decoding the encoded results by concatenating the encoded results to obtain a reconstructed speech output.

Although FIG. 4 shows example operations of the method, in some implementations, the method may include additional operations, fewer operations, different operations, or differently arranged operations than those depicted in FIG. 4. Additionally, or alternatively, two or more of the operations of the method may be performed in parallel or combined.

Figure 5:
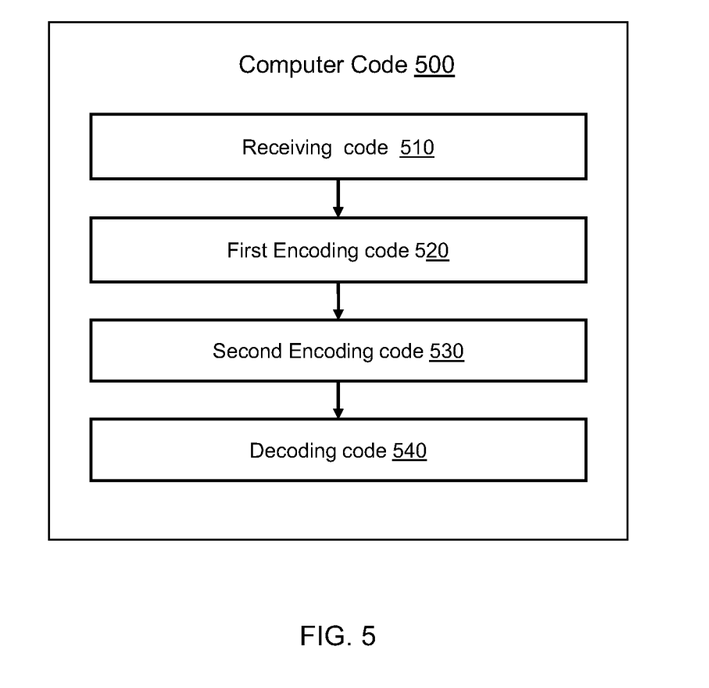
FIG. 5 is a block diagram of an example of computer code for disentangled variational speech representation learning for zero-shot voice conversion, according to one or more embodiments.

FIG. 5 is a block diagram of an example of computer code for disentangled variational speech representation learning for voice conversion, according to one or more embodiments. According to embodiments of the present disclosure, at least one processor with memory storing computer code may be provided. The computer code may be configured to, when executed by the at least one processor, perform any number of aspects of the present disclosure.

As shown in FIG. 5, the computer code 500 may include receiving code 510, first encoding code 520, second encoding code 530, and decoding code 540.

The receiving code 510 is configured to cause the at least one processor to receive input speech segments.

The first encoding code 520 is configured to cause the at least one processor to encode the input speech segments via a shared encoder to generate a speaker embedding and a content embedding.

The second encoding code 530 is configured to cause the at least one processor to encode the posterior distributions of the speaker embedding via a speaker encoder and encode the posterior distributions of the content embedding via a content encoder to obtain encoded results.

The decoding code 540 is configured to cause the at least one processor to decode the encoded results by concatenating the encoded results to obtain a reconstructed speech output.

Although FIG. 5 shows example blocks of the computer code 500 of an apparatus or device according to embodiments, in some implementations, the apparatus may include additional blocks, fewer blocks, different blocks, or differently arranged blocks than those depicted in FIG. 5. Additionally, or alternatively, two or more of the blocks of the apparatus may be combined. In other words, while FIG. 5 shows distinct blocks of code, the various code instructions need not be distinct and could be intermingled.

The embodiments describe a method for improving VC performance and robustness even with noisy source/target utterances. The disentanglement in speech is evaluated by performing speaker verification on the speaker embeddings and the content embeddings, respectively, and the equal error rate (EER) is observed. By varying the weighted factor of the KL divergences in the loss objective, embodiments of the present disclosure advantageously obtains better results compared to the baseline DSVAE method, as shown in Table 1.

TABLE 1

EER (%) for TIMIT test trials on varying $\frac{\beta}{\alpha}$.

| $\frac{\beta}{\alpha}$ | 1 | 10 | 20 | 100 | DSVAE [16] |
|---|---|---|---|---|---|
| $\mu_S$ | 5.40 | 3.25 | 4.16 | 5.01 | 4.94 |
| $\mu_C$ | 31.09 | 38.83 | 37.16 | 38.79 | 17.49 |

Although a good EER is necessary, a good EER alone is not a sufficient condition for good disentanglement. The mean opinion score (MOS) is also obtained to evaluate the naturalness of the converted speech. Under both a clean and noisy scenario, embodiments of the present disclosure provide a better MOS than, for example, AUTOVC and AdaIN-VC, as shown in Table 2.

TABLE 2

The results of the MOS (95% CI) test on different models.

| model | seen to seen | | unseen to unseen | |
|---|---|---|---|---|
| | naturalness | similarity | naturalness | similarity |
| AUTOVC [13] | 2.65 ± 0.12 | 2.86 ± 0.09 | 2.47 ± 0.10 | 2.76 ± 0.08 |
| AdaIN-VC [14] | 2.98 ± 0.09 | 3.06 ± 0.07 | 2.72 ± 0.11 | 2.96 ± 0.09 |
| Ours | 3.40 ± 0.07 | 3.56 ± 0.06 | 3.22 ± 0.09 | 3.54 ± 0.07 |
| Ours(noisy) | 3.23 ± 0.09 | 3.43 ± 0.07 | 3.12 ± 0.08 | 3.47 ± 0.08 |

On both TIMIT and VCTK datasets, embodiments achieve enhanced performance on objective evaluations (i.e., speaker verification (SV) on both speaker embedding and content embedding). For VC with the VCTK dataset, embodiments achieve competitive performance in terms of voice naturalness and similarity, and remains to be robust even with noisy source/target utterances.

The foregoing disclosure provides illustrations and descriptions, but is not intended to be exhaustive or to limit the implementations to the precise form disclosed. Modifications and variations are possible in light of the above disclosure or may be acquired from practice of the implementations.

Some embodiments may relate to a system including at least one memory configured to store computer program code and at least one processor configured to access the computer program code and operate as instructed by the computer program code, a method, and/or a computer readable medium at any possible technical detail level of integration. The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein may be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, software instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer readable media according to various embodiments. In this regard, each block in the block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the figures. In some alternative implementations, the functions noted in the blocks may occur out of the order noted in the figures. For example, two blocks shown in succession may, in fact, be executed concurrently or substantially concurrently, or the blocks may sometimes be executed in the reverse order, depending upon the functionality involved. It will also be noted that each block of the block diagrams, and combinations of blocks in the block diagrams, can be implemented by special purpose hardware-based systems that perform the specified functions or acts or carry out combinations of special purpose hardware and computer instructions.

It will be apparent that systems and/or methods, described herein, may be implemented in different forms of hardware, software, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

The descriptions of the various aspects and embodiments have been presented for purposes of illustration, but are not intended to be exhaustive or limited to the embodiments disclosed. Even though combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method for disentangled variational speech representation learning for voice conversion, performed by at least one processor and comprising:
receiving input speech segments;

encoding the input speech segments via a shared encoder to generate a speaker embedding and a content embedding;

encoding posterior distributions of the speaker embedding via a speaker encoder and encoding posterior distributions of the content embedding via a content encoder to obtain encoded results; and decoding the encoded results by concatenating the encoded results to obtain a reconstructed speech output, wherein the shared encoder includes:
   a 2-layer meridian lossless packing (MLP) with a first hidden size, and
   convolutional layers with a plurality of channels of which each of the convolutional layers is followed by a linear layer and an Instancenorm2D layer.

2. The method of claim 1, wherein the content embedding and a target embedding are concatenated when inferencing to obtain a voice conversion speech output.

3. The method of claim 1, wherein the method is performed on Texas Instruments/Massachusetts Institute of Technology (TIMIT) and voice cloning toolkit (VCTK) datasets.

4. The method of claim 3, wherein, when performed on TIMIT:
   the shared encoder is the 2-layer meridian lossless packing (MLP) with the first hidden size;
   the content encoder is a 2-layer BiLSTM with a second hidden size, followed by a recurrent neural network (RNN) layer with the second hidden size, followed by a 2-layer MLP of a third hidden size; and
   the speaker encoder is a 2-layer BiLSTM with the second hidden size, followed by a recurrent neural network (RNN) layer with the second hidden size, followed by an average pooling layer, followed by the 2-layer MLP of the third hidden size.

5. The method of claim 3, wherein, when performed on VCTK, the shared encoder includes the convolutional layers with the plurality of channels.

6. The method of claim 1, wherein a total loss is based on a loss of the posterior distributions of the speaker embedding and the content embedding.

7. The method of claim 1, wherein the disentangled variational speech representation learning is further trained by using an augmentation of the encoded results as input to the shared encoder while decoding the encoded results to obtain the reconstructed speech output.

8. An apparatus for disentangled variational speech representation learning for voice conversion, the apparatus comprising:
   at least one memory configured to store program code; and
   at least one processor configured to read the program code and operate as instructed by the program code, the program code including:
      receiving code configured to cause the at least one processor to receive input speech segments;
      first encoding code configured to cause the at least one processor to encode the input speech segments via a shared encoder to generate a speaker embedding and a content embedding;
      second encoding code configured to cause the at least one processor to encode posterior distributions of the speaker embedding via a speaker encoder and encode posterior distributions of the content embedding via a content encoder to obtain encoded results; and
      decoding code configured to cause the at least one processor to decode the encoded results by concatenating the encoded results to obtain a reconstructed speech output,
   wherein the shared encoder includes:
      a 2-layer meridian lossless packing (MLP) with a first hidden size, and
      convolutional layers with a plurality of channels of which each of the convolutional layers is followed by a linear layer and an Instancenorm2D layer.

9. The apparatus of claim 8, wherein the content embedding and a target embedding are concatenated when inferencing to obtain a voice conversion speech output.

10. The apparatus of claim 8, wherein the disentangled variational speech representation learning for voice conversion is performed on Texas Instruments/Massachusetts Institute of Technology (TIMIT) and voice cloning toolkit (VCTK) datasets.

11. The apparatus of claim 10, wherein, when performed using TIMIT:
   the shared encoder is the 2-layer meridian lossless packing (MLP) with the first hidden size;
   the content encoder is a 2-layer BiLSTM with a second hidden size, followed by a recurrent neural network (RNN) layer with the second hidden size, followed by a 2-layer MLP of a third hidden size; and
   the speaker encoder is a 2-layer BiLSTM with the second hidden size, followed by a recurrent neural network (RNN) layer with the second hidden size, followed by an average pooling layer, followed by the 2-layer MLP of the third hidden size.

12. The apparatus of claim 10, wherein, when performed using VCTK, the shared encoder includes the convolutional layers with the plurality of channels.

13. The apparatus of claim 8, wherein a total loss is based on a loss of the posterior distributions of the speaker embedding and the content embedding.

14. The apparatus of claim 8, wherein the disentangled variational speech representation learning is further trained by using an augmentation of the encoded results as input to the shared encoder while decoding the encoded results to obtain the reconstructed speech output.

15. A non-transitory computer readable medium storing instructions, the instructions comprising: one or more instructions that, when executed by at least one processor of an apparatus for disentangled variational speech representation learning for voice conversion storing instructions that, cause the at least one processor to:
   receive input speech segments;
   encode the input speech segments via a shared encoder to generate a speaker embedding and a content embedding;
   encode posterior distributions of the speaker embedding via a speaker encoder and encode posterior distributions of the content embedding via a content encoder to obtain encoded results; and
   decode the encoded results by concatenating the encoded results to obtain a reconstructed speech output,
   wherein the shared encoder includes:
      a 2-layer meridian lossless packing (MLP) with a first hidden size, and
      convolutional layers with a plurality of channels of which each of the convolutional layers is followed by a linear layer and an Instancenorm2D layer.

16. The non-transitory computer readable medium of claim 15, wherein the content embedding and a target embedding are concatenated when inferencing to obtain a voice conversion speech output.

17. The non-transitory computer readable medium of claim 15, wherein the disentangled variational speech representation learning for voice conversion is performed on Texas Instruments/Massachusetts Institute of Technology (TIMIT) and voice cloning toolkit (VCTK) datasets.

18. The non-transitory computer readable medium of claim 17, wherein, when performed using TIMIT:
   the shared encoder is the 2-layer meridian lossless packing (MLP) with the first hidden size;
   the content encoder is a 2-layer BiLSTM with a second hidden size, followed by a recurrent neural network (RNN) layer with the second hidden size, followed by a 2-layer MLP of a third hidden size; and
   the speaker encoder is a 2-layer BiLSTM with the second hidden size, followed by a recurrent neural network (RNN) layer with the second hidden size, followed by an average pooling layer, followed by the 2-layer MLP of the third hidden size.

19. The non-transitory computer readable medium of claim 17, wherein, when performed using VCTK, the shared encoder includes the convolutional layers with the plurality of channels.

20. The non-transitory computer readable medium of claim 15, wherein a total loss is based on a loss of the posterior distributions of the speaker embedding and the content embedding.

* * * * *